(12) United States Patent
Baumeister et al.

(10) Patent No.: US 11,607,647 B2
(45) Date of Patent: Mar. 21, 2023

(54) DEVICE AND PROCESS FOR THE MANUFACTURE OF HOLLOW FIBER MEMBRANE BUNDLES

(71) Applicant: GAMBRO LUNDIA AB, Lund (SE)

(72) Inventors: Franz Baumeister, Uhldingen (DE);
Ulrich Bauer, Hechingen (DE);
Christian Hirssig, Burladingen (DE)

(73) Assignee: GAMBRO LUNDIA AB, Lund (SE)

( * ) Notice: Subject to any disclaimer, the term of this patent is extended or adjusted under 35 U.S.C. 154(b) by 714 days.

(21) Appl. No.: 16/497,642

(22) PCT Filed: Mar. 28, 2018

(86) PCT No.: PCT/EP2018/057851
§ 371 (c)(1),
(2) Date: Sep. 25, 2019

(87) PCT Pub. No.: WO2018/178124
PCT Pub. Date: Oct. 4, 2018

(65) Prior Publication Data
US 2021/0106949 A1    Apr. 15, 2021

(30) Foreign Application Priority Data
Mar. 29, 2017    (EP) ..................................... 17163552

(51) Int. Cl.
*B01D 63/02* (2006.01)
*B01D 63/04* (2006.01)
(Continued)

(52) U.S. Cl.
CPC ......... *B01D 63/022* (2013.01); *B01D 63/043* (2013.01); *B65H 54/58* (2013.01);
(Continued)

(58) Field of Classification Search
CPC ............ B01D 2313/04; B01D 2313/56; B01D 63/021; B01D 63/022; B01D 63/043; B01D 2313/23; B01D 65/003; B01D 2313/02; B01D 2323/42; B01D 2313/025; B01D 2313/21; B01D 2313/13; B65H 2701/33; B65H 54/58; B65H 54/62; B65H 54/56;
(Continued)

(56) References Cited

U.S. PATENT DOCUMENTS 4,276,687 A    7/1981    Schnell
4,681,720 A    7/1987    Baumgart et al.
(Continued)

FOREIGN PATENT DOCUMENTS

DE    19909608    1/2000
DE    102014019506    6/2016

OTHER PUBLICATIONS

English language machine translation of WO2016102364, 15 Pages, No Date.*

(Continued)

*Primary Examiner* — Pranav N Patel
(74) *Attorney, Agent, or Firm* — Barnes & Thornburg LLP

(57) ABSTRACT

The present disclosure relates to devices and processes for the production of hollow fiber membrane bundles. The bundles are used for the manufacture of filtration and/or diffusion devices, e.g., capillary dialyzers.

20 Claims, 4 Drawing Sheets

(51) Int. Cl.
*B65H 54/58* (2006.01)
*B65H 54/62* (2006.01)

(52) U.S. Cl.
CPC ......... *B65H 54/62* (2013.01); *B01D 2313/04* (2013.01); *B01D 2313/56* (2013.01); *B65H 2701/33* (2013.01)

(58) Field of Classification Search
CPC .. B65H 54/22; B65H 67/048; B65H 2701/31; B29C 63/14; B29C 53/60; B29C 63/065; B29C 63/046; B29C 53/66; B65B 11/00; B65B 27/125; Y10T 156/103
See application file for complete search history.

(56) References Cited

U.S. PATENT DOCUMENTS

2004/0182772 A1* 9/2004 Dannenmaier ........ B01D 65/00
210/321.8
2014/0230369 A1 8/2014 Reuschenbach et al.

OTHER PUBLICATIONS

PCT Search Report and Written Opinion prepared for PCT/EP2018/057851, completed Jun. 20, 2018.

* cited by examiner a)

b)

a)

b)

c)

DEVICE AND PROCESS FOR THE MANUFACTURE OF HOLLOW FIBER MEMBRANE BUNDLES

CROSS-REFERENCE TO RELATED APPLICATIONS

This application is the U.S. national phase of PCT/EP2018/057851, filed on Mar. 28, 2018, which claims the benefit of European Patent Application Serial Number 17163552.7, filed on Mar. 29, 2017, the entire disclosures of both of which are incorporated herein by reference.

TECHNICAL FIELD

The present disclosure relates to devices and processes for the production of hollow fiber membrane bundles. The bundles are used for the manufacture of filtration and/or diffusion devices, e.g., capillary dialyzers.

DESCRIPTION OF THE RELATED ART

U.S. Pat. No. 4,276,687 A discloses a process for the production of hollow fiber bundles which involves winding the fibers onto a reel member to form an annular assembly of the fibers and thereafter cutting the annular assembly into separate bundles. Individual bundles are wrapped in a flexible sheet and cut at their ends.

U.S. Pat. No. 4,681,720 A discloses a method and a device for producing bundles of hollow fibers such as used for dialysis. The device includes a guiding device for a continuous fiber which rotates in a plane. At least two groups of take-up elements are mounted on a conveyor. The conveyor is intermittently activated so that a group of take-up elements is placed in a working position in the range of movement of the guiding device, and a strand of a desired thickness is wound around the take-up elements. Thereafter, the conveyor is activated to discharge the first group together with the completed strand from the working position and place the subsequent empty group of take-up elements in the working position, without interruption of movement of the guiding device. During the winding-up of the subsequent strand, the completed strand is cut and wrapped into bundles.

U.S. Pat. No. 6,951,611 A discloses a method for manufacturing a hollow fiber membrane module which involves filter housings having first and second portions flexibly connected to each other. The filter housings are mounted on a winding wheel; hollow fibers are continuously fed to the first portions of the filter housings as the wheel is rotated; and subsequently the first and second portions of the filter housing are joined.

WO 2016/102364 A1 (DE 10 2014 019 506 A1) discloses an apparatus for winding a foil around a strand of hollow fiber membranes having an irregular cross-section and for forming the strand to circular bundles. The device comprises at least four form segments which can be moved towards the center of a circle individually. The contours of their profiles form a closed line of approximately circular shape when the segments are moved.

EP 2 420 464 B1 discloses an apparatus for wrapping a fiber bundle with a film. The apparatus comprises a receiver of first and second side elements and a flexible channel fastened between them for the reception of the film and the fiber bundle, and at least one folding device moveable transversely to the channel for the folding of the film around the fiber bundle. A drive is provided to move at least the first side element transversely to the channel, and a front edge of the first side element facing towards the channel can be moved past the front edge of the second side element facing towards the channel so that the flexible channel can be bent to form a cylinder.

GB 1 175 689 A discloses a method of making a dialyzer, comprising assembling a plurality of elongated laterally-aligned substantially parallel hollow filaments to form an elongated bundle, surrounding the elongated bundle with a flexible porous sleeve member, extending the sleeve member along the length of said bundle and causing a uniform reduction in the circumference of the sleeve member along the length of the bundle to constrain and laterally compress the bundle.

EP 0 639 383 B1 discloses a method of wrapping a bundle of fibers comprising the steps of applying a predetermined tension to the bundle longitudinally thereof and at opposite ends of the bundle; then wrapping a tape helically around the bundle and from one of the opposite ends towards the other end so that the tape covers the bundle almost entirely, while maintaining the tension applied thereto; and finally unwinding the tape off the bundle so as to expose the bundle gradually from the other end towards the one end, while inserting the thus exposed portion of the bundle gradually into a cylindrical protector.

DE 198 06 293 A1 discloses a method for wrapping a bundle of hollow fibers with a sheet of paper or plastic, which comprises positioning the sheet on a flexible support and depositing the bundle on top of the sheet, wrapping the side parts of the support including the sheet around the fiber bundle in such a manner that the sheet envelops the fiber bundle and its sides overlap to produce a cylindrical wrap.

U.S. Pat. No. 4,224,094 A discloses a method and apparatus for the simultaneous preparation of several hollow fiber devices, wherein at least one hollow fiber is wound around means, at least three in number, located in different planes thereby obtaining with this fiber an envelope having a polygonal section, which can be cut in at least two places as it is formed, so as to obtain at least two distinct groups of hollow fiber lengths.

DE 199 09 608 A1 discloses a packing machine for putting sausages into a jar. The machine comprises holders for a number of sausages being added to jars, holders for the jars, and feed devices for transferring groups of sausages from the holders into the jars.

SUMMARY

The present disclosure provides devices and processes for the production of bundles of hollow fiber membranes. Each bundle is enveloped in a sheet of a wrapping material.

DETAILED DESCRIPTION

Figure 1:
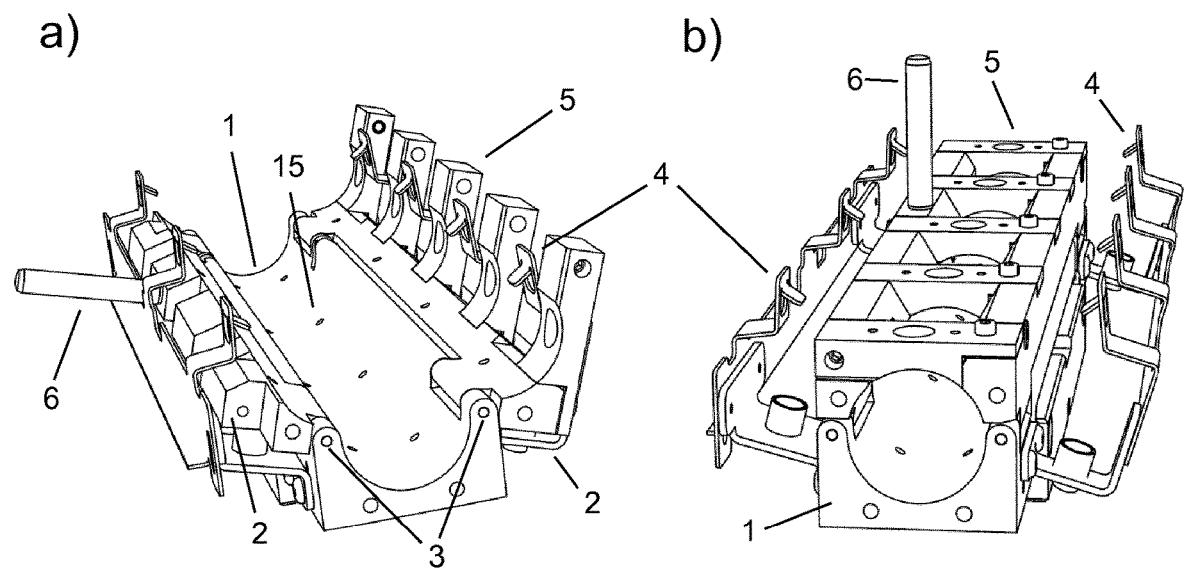
FIG. 1 shows perspective views of an embodiment of a device for producing bundles of hollow fiber membranes according to the present disclosure: a) open configuration, b) closed configuration.

The present disclosure provides a winding wheel equipped with a plurality of devices for the production of a bundle of hollow fiber membranes enveloped in a sheet of wrapping material. In one embodiment, each of the devices is a three-part device for wrapping a bundle of hollow fiber membranes which comprises a base and two rigid flaps connected to the base via hinges. The hinges are located on the longitudinal brims of the trough. Each flap can be rotated around the respective hinge, to move the flap between a first position and a second position.

The base features a trough in the shape of a cylinder section. In one embodiment, the cylinder section is a half cylinder, i.e., its cross-sectional area is a semicircle. In another embodiment, the cross-sectional area of the cylinder section is a circular segment having a central angle $\alpha$ of less than 180°.

The rigid flaps are aligned to the longitudinal sides of the trough, i.e., the hinges are parallel to the longitudinal axis of the trough. The inner surface of each flap forms a cylinder section. In one embodiment, the central angle $\alpha$ of the cylinder section is the same for both flaps. As an example, the central angle $\alpha$ of the cross-sectional area of the cylinder section may be 90°. In another embodiment, one flap is larger than the other, i.e., the central angle $\alpha$ of the cylinder section of one flap is larger than the central angle $\alpha$ of the cylinder section of the other flap.

In one embodiment, at least one of the flaps has finger-like protrusions. The finger-like protrusions are located at the edge of the flap opposite to the hinged edge of the flap. In another embodiment, both flaps have finger-like protrusions. In one embodiment, the tips of the protrusions touch when both flaps are in the second position. In another embodiment, the tips of the protrusions interlock when both flaps are in the second position.

By moving both flaps to the first position, a first configuration ("opened") of the device is attained. In this configuration, the device can receive a sheet of wrapping material and a plurality of fibers.

When both flaps are moved to the second position, a second configuration ("closed") of the device is attained. In this configuration, the trough and the two flaps together frame a cylindrical void. In other words, in the second configuration, the inner surfaces of the device, that is, the inner surfaces of the trough and the flaps all are positioned on the surface area of a cylindrical void. In one embodiment, the inner surface of the device completely covers the surface of the cylindrical void, i.e., the inner surface of the device forms a cylinder. In another embodiment, the inner surface only partially covers the surface of the cylindrical void, i.e., a segment of the surface of the cylindrical void is open. Only a part of the circumference of the cylindrical void is covered by the trough and the two flaps together when both flaps are in the second position. As an example, there may be a gap between the edges of the flaps when both flaps are in the second position. In other words, the two flaps do not touch each other when both flaps are in the second position.

In one embodiment, each of the devices of the present disclosure features means for fastening a sheet of wrapping material in the device. An example of such means is a suction device. For instance, suction nozzles may be incorporated into the trough of the base of the device. After a sheet of wrapping material has been introduced into the device, negative pressure is applied to the nozzles and the sheet is aspirated to the surface of the trough and locked in position. Another example of fastening means includes holding elements which lock opposite edges of the sheet of wrapping material. For instance, a plurality of clips or stoppers can be provided on both sides of the trough which fasten opposite edges of the sheet of wrapping material after its introduction into the device.

Examples of suitable wrapping materials for enveloping a bundle of hollow fiber membranes include polymer film, paper, and aluminum foil. Suitable polymers include polyolefins, for instance, polyethylene or polypropylene. Composite polymer films or multi-layer films also may be used. The wrapping material is either uncoated or coated. The coating may be present on the entire surface of the wrapping material (i.e., on both sides of a sheet of the wrapping material), or only on parts of its surface. For example, only the surface of one side of the wrapping material may be coated. In another embodiment, only a strip of the surface near one edge of a sheet of wrapping material is coated. Alternatively, two strips near opposite edges of a sheet of wrapping material are coated. Examples of suitable coatings include thermoplastic polymers and adhesives. Examples of suitable adhesives include reactive adhesives, hot-melt adhesives, and photosensitive adhesives like UV-curable adhesives.

In one embodiment, the winding wheel is equipped with 4 to 30 devices. In one embodiment, the winding wheel additionally comprises means for moving the flaps of the devices back and forth between the first position and the second position, i.e., changing the configuration of the devices between the opened and the closed configuration, and between the closed and the opened configuration. The winding wheel allows for the simultaneous production of multiple bundles of hollow fiber membranes enveloped in a sheet of wrapping material.

The present disclosure also provides a process for preparing a plurality of bundles of hollow fiber membranes, each bundle being enveloped in a sheet of wrapping material. The process comprises, in sequence, the steps of a) moving both flaps of each of the three-part devices of a winding wheel as described above into the first position; b) introducing a sheet of wrapping material into each device; c) introducing a plurality of hollow fiber membranes into each device by winding a strand of hollow fiber membranes onto the winding wheel into the troughs of the devices, so that the hollow fiber membranes are located atop the sheet of wrapping material; d) forming a cylindrical bundle of hollow fiber membranes and enveloping it with the wrapping material by successively moving the flaps into the second position; and e) sealing the longitudinal edge of the sheet of wrapping material.

The process employs a plurality of three-part devices mounted on a winding wheel to simultaneously produce a plurality of bundles of hollow fiber membranes, each bundle being enveloped in a sheet of wrapping material.

In one embodiment, the process of the present disclosure comprises an additional step f) of cutting the hollow fiber membranes in between the individual devices subsequently to step e).

In one embodiment, the process for producing bundles of hollow fiber membranes enveloped in wrapping material provided by the present disclosure involves feeding hollow fibers to a winding wheel and collecting the fiber strand in receptacles arranged on the outer circumference of the winding wheel by turning the wheel. Each receptacle comprises a sheet of wrapping material. As soon as the desired fiber bundle thickness or fiber bundle size has been reached, the winding wheel is stopped and the receptacles are closed, thereby wrapping the sheet of wrapping material around the strand of hollow fibers. The wrapping material is sealed and subsequently the hollow fibers are cut between the receptacles. The receptacles are opened and the wrapped fiber bundles are removed from the winding wheel and transferred to an apparatus for placing the fiber bundles into tubular filter casings. The apparatus transfers the fiber bundle into the casing and removes the sheath of wrapping material. The sheath of wrapping material is discarded or recycled to produce wrapping material again.

In one embodiment, the flaps of the receptacles feature means that facilitate opening and closing of the flaps, e.g., handles, knobs, or rollers attached to each flap. In the course of the process, the receptacles are opened and closed as required, e.g. using a robot. In one embodiment, a winding wheel having a plurality of receptacles mounted thereon is equipped with means which mechanically close or open, as required for the respective process step, the flaps when the wheel rotates.

In one embodiment of the process, step b) involves the transfer of a sheet of wrapping material from a stack into the device. A transport apparatus removes a single sheet of wrapping material from the stack, transfers and introduces it into the device. In another embodiment, a sheet of wrapping material is first cut from a spool of wrapping material, and then picked up by the transport apparatus and transferred and introduced into the device. In one embodiment, the transport apparatus is equipped with suction nozzles which aspirate the sheet of wrapping material. In another embodiment, the transport apparatus is equipped with pliers or pincers to pick up the sheet of wrapping material.

The size of the sheet of wrapping material is dependent on the length and diameter of the fiber bundle to be wrapped. In one embodiment, the width of the sheet is chosen so that its longitudinal edges overlap when the device is closed. In one embodiment, the size of the overlap is in the range of from 2 to 20 mm, for instance, 5 to 15 mm.

In step e) of the process, the wrapping material is sealed. A variety of sealing techniques can be applied, depending on the kind of wrapping material used. Suitable techniques include adhesive bonding, e.g. using adhesive tape, hot melt adhesives, dry adhesives, reactive adhesives, or UV-curable adhesives. When the wrapping material is thermoplastic, welding can be used, e.g., arc welding, impulse welding, hot air sealing, ultrasonic welding etc.

After removal from the receptacle, the bundles of hollow fiber membranes enveloped in wrapping material can directly be processed to produce filters. They can also be stored for later use or shipped to another location for processing. The wrapped fiber bundles are less prone to be damaged during handling and transport than fiber bundles that are not enveloped in wrapping material.

An alternative process for producing bundles of hollow fiber membranes enveloped in wrapping material involves a single three-part device as described above, having a longitudinal extension corresponding to from 2 to 30 times the length of a filter housing. The device is loaded either with a single sheet of wrapping material matching the length of the device, or with a plurality of sheets, each sheet having a length fitting into a single filter housing. The sheets are loaded into the device adjacent to each other, their combined length matching the longitudinal extension of the device. A strand of hollow fiber membranes is introduced into the device and a bundle of hollow fiber membranes enveloped in wrapping material is produced by closing the flaps of the device and sealing the wrapping material as described above. The wrapped bundle subsequently is cut into individual bundles, each bundle having the length required to fit into a tubular filter housing.

In another alternative process, a plurality of receptacles is arranged in linear sequence on an elongated support instead of a winding wheel. Each receptacle is loaded with a sheet of wrapping material, and a strand of hollow fiber membranes is introduced into all the devices simultaneously. The flaps of the receptacles are closed to produce a bundle of hollow fiber membranes enveloped in wrapping material, and the sheet of wrapping material in each receptacle is sealed as described above. The wrapped bundle subsequently is cut into individual bundles in between the individual receptacles.

Exemplary embodiments of the device and the process of the present disclosure are further described hereafter with reference to the drawings. Throughout the figures, the same reference signs are used to refer to similar features.

It will be understood that the features mentioned above and those described hereinafter can be used not only in the combination specified but also in other combinations or on their own, without departing from the scope of the present invention.

DETAILED DESCRIPTION OF THE DRAWINGS

FIG. 1 shows two perspective views of an embodiment of a device for producing bundles of hollow fiber membranes. Drawing a) shows the device in open configuration, drawing b) in closed configuration. The device comprises an elongated base 1 featuring a trough having the shape of a cylinder section. On each longitudinal side of the trough of base 1, a rigid flap 2 is located. The inner surface of each flap 2 forms a cylinder section. Each flap 2 is connected to the base 1 via a hinge 3, so that the flap 2 is moveable between a first position, shown in drawing a) and a second position shown in drawing b) and also referred to as "closed". When both flaps 2 are in the first position, as in drawing a), the device has a configuration also referred to as "opened". In the open configuration, a sheet of wrapping material can be introduced into the device. Nozzles 15 connected to a suction device are provided in the trough of base 1 to aspirate the sheet of wrapping material to the surface of base 1. The longitudinal edges of the sheet will be locked by holding elements 4. In the embodiment shown in FIG. 1, the holding elements 4 are formed by a plurality of clips or claws mounted on the sides of base 1. The holding elements provide stoppers for the sheet of wrapping material and lock its longitudinal edges in position. A plurality of fibers can be introduced into the device on top of the sheet of wrapping material, when both flaps 2 are in the first position. As can be seen in FIG. 1, the flaps 2 do not have the same size. The flap 2 on the right side of base 1 is larger than the flap 2 on the left side of base 1. The flap 2 on the right side of base 1 features five finger-like protrusions 5. When both flaps 2 are moved into the second position, the finger-like protrusions 5 of the right flap 2 interlock with corresponding openings in the left flap 2. A handle 6 is provided on the left flap to facilitate moving the left flap 2 between the first and the second position. When both flaps 2 are in the second position, as in drawing b), the device has a configuration also referred to as "closed". As can be seen in drawing b), the trough of base 1 and the inner surface of the flaps 2 together frame a cylindrical void, when the device is in closed configuration.

Figure 2:
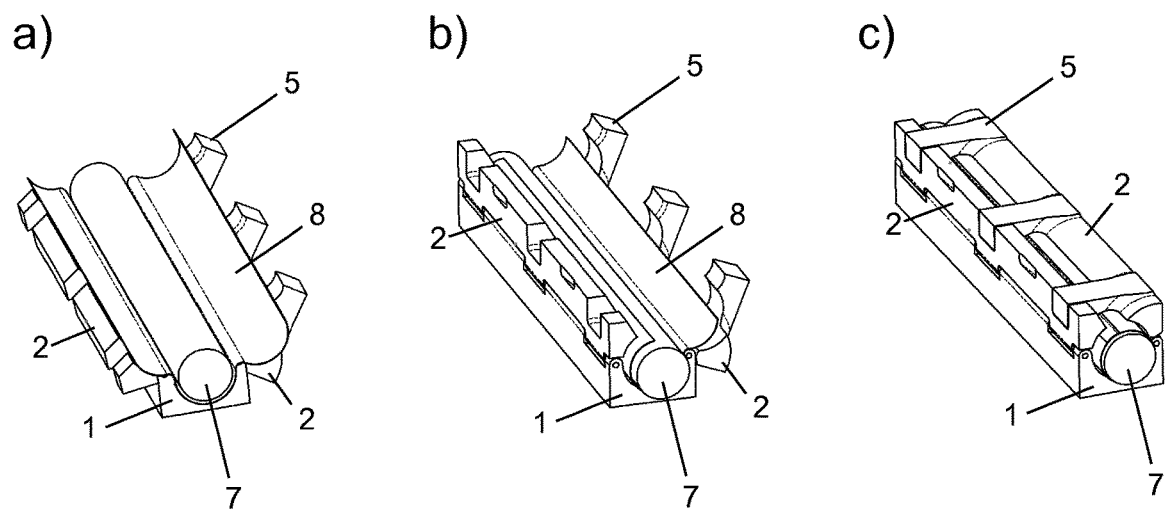
FIG. 2 shows perspective views of another embodiment of the device of the present disclosure including a sheet of wrapping material and a bundle of hollow fiber membranes and illustrates wrapping of the bundle with the wrapping material: a) both flaps in position 1, b) left flap in position 2 and right flap in position 1, c) both flaps in position 2.

FIG. 2 shows three perspective views of another embodiment of the device of the present disclosure and illustrates wrapping of a bundle of hollow fiber membranes with a wrapping material using the device. The flap 2 on the right side of base 1 features three finger-like protrusions corresponding to three openings on the flap 2 on the left side of base 1. The distance between the protrusions 5 is larger than in the device shown in FIG. 1. FIG. 2 shows the device with a sheet 8 of wrapping material and a bundle 7 of hollow fiber membranes.

Drawing a) shows both flaps in the first position, i.e., the device is in the opened configuration. The sheet 8 of wrapping material is locked in place by aspiration to suction nozzles located in the trough of base 1 (not shown). In drawing b), the left flap 2 has been moved to its second position, folding one edge of the sheet 8 of wrapping material over the bundle 7 of hollow fiber membranes. In drawing c), the right flap 2 also has been moved into its second position, folding the second edge of the sheet 8 of wrapping material over the bundle 7 of hollow fiber membranes and forming an overlapping zone of the wrapping material. Both flaps 2 are in the second position, i.e., the device is in closed configuration.

Figure 3:
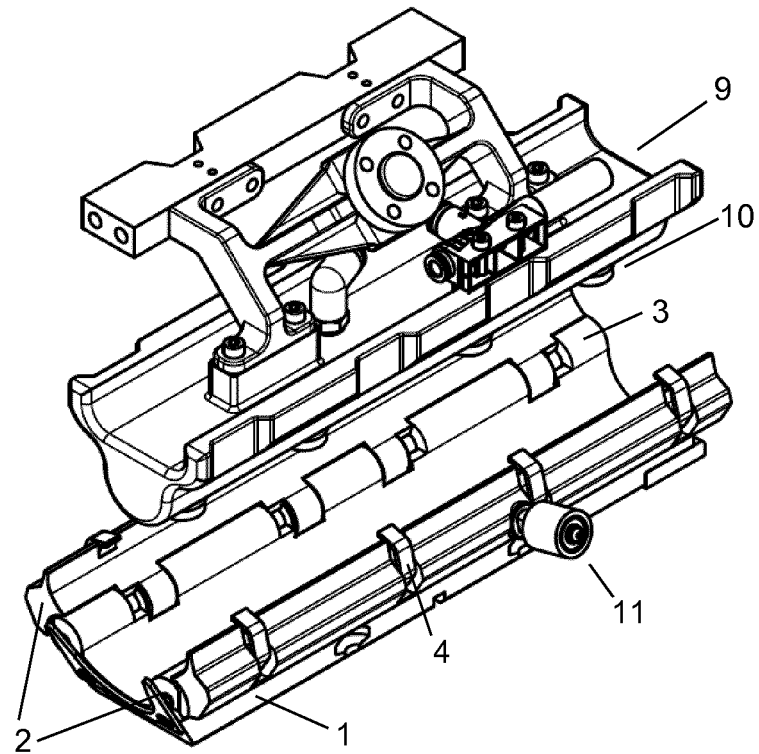
FIG. 3 shows views of a further embodiment of the device of the present disclosure and a transport device for loading a sheet of wrapping material into the device and unloading a wrapped bundle from the device: a) perspective view with transport device in a first position, b) front view with transport device in a second position.
Figure 3:
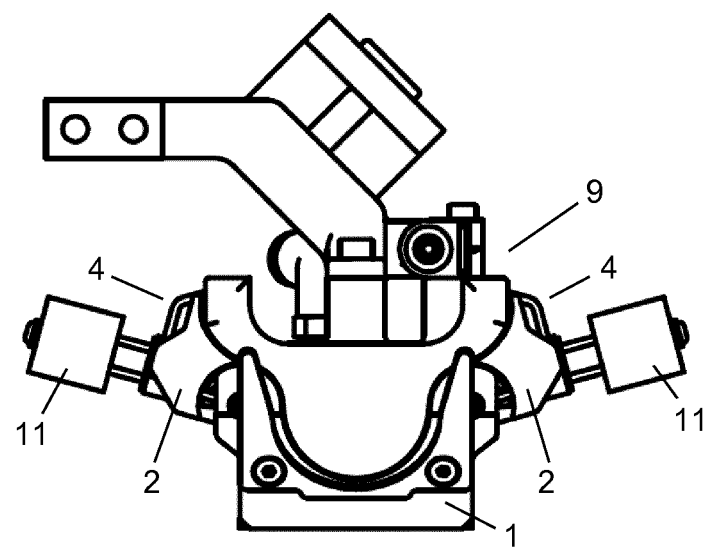

FIG. 3 shows two views of a further embodiment of the device of the present disclosure and a transport device 9 for loading a sheet of wrapping material into the device and unloading a wrapped bundle from the device. Drawing a) shows a perspective view of the device with a transport device 9 in a first position. The transport device 9 features a plurality of vacuum cups 10 which are configured to aspirate a sheet of wrapping material that is to be loaded to the device, or a bundle of hollow fiber membranes enveloped in wrapping material to be removed from the device, as required by the respective process step. In the embodiment shown in FIG. 3, both flaps 2 have the same size. i.e., they are symmetrical to each other. The width of flaps 2 is relatively small, such that the two flaps 2 do not touch each other when both flaps 2 are in the second position. As a consequence, only part of the circumference of the cylindrical void is covered by the combined inner surfaces of the trough of base 1 and the two flaps 2 when both flaps 2 are in the second position, and not the entire circumference, as with the devices shown in FIGS. 1 and 2. Rollers 11 are provided on both flaps 2 to facilitate moving the flaps 2 between their first and second positions, i.e., opening and closing the device. Drawing b) shows a front view of the device with transport device 9 in a second position. The head of transport device 9 is inserted into the device, the contour of the head matching the contours of the trough of base 1 and the inner surface of flaps 2 in their first position. In this position of the transport device 9, a sheet of wrapping material held by the vacuum cups 10 of the transport device 9 would be loaded into the device and locked in place by holding elements 4. The sheet of wrapping material then would be released by the vacuum cups 10, and the transport device 9 removed from the device and, for instance, moved back to the position shown in drawing a).

Figure 4:
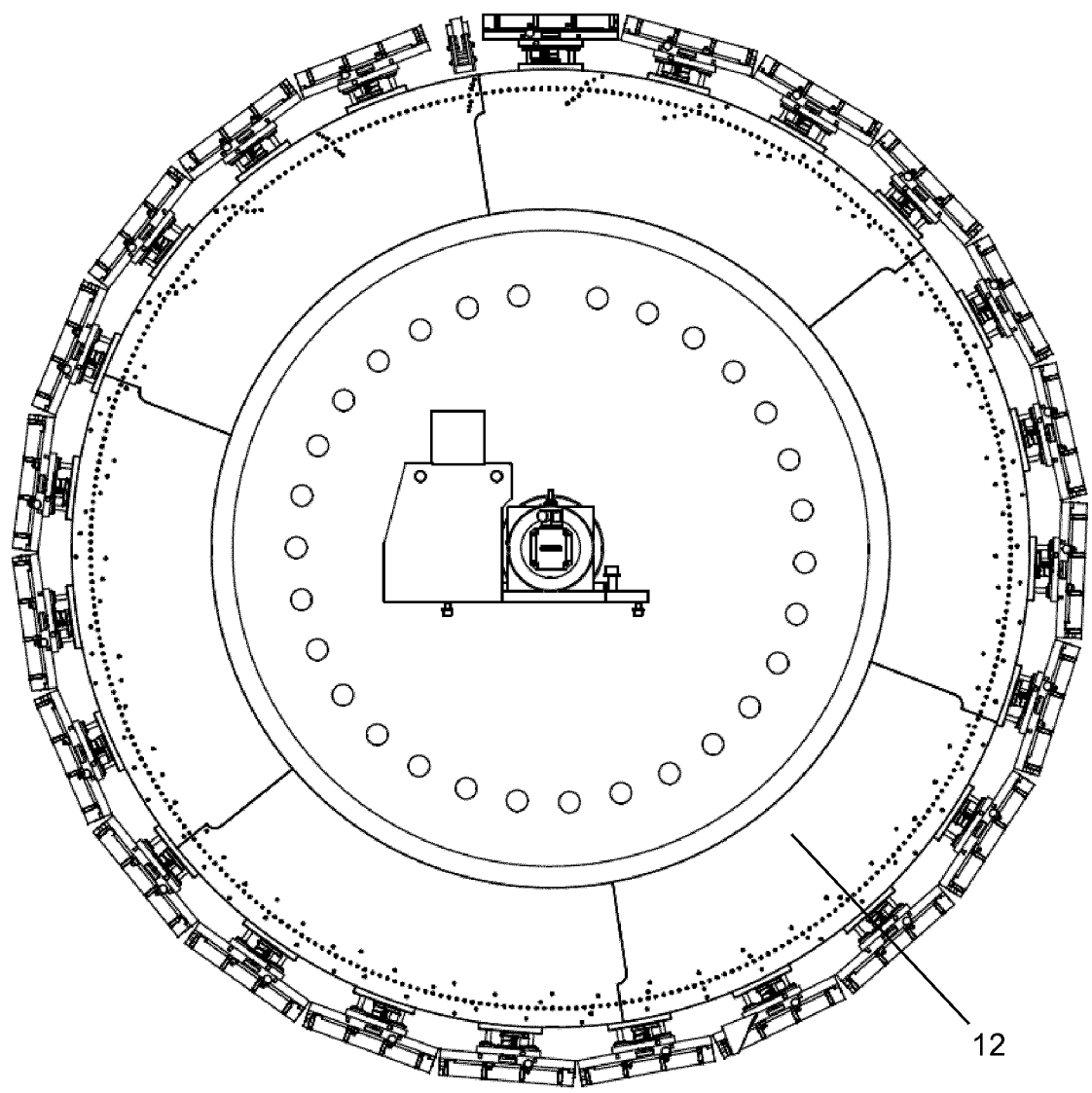
FIG. 4 shows a perspective view of a winding wheel equipped with a plurality of devices of the present disclosure.

FIG. 4 shows a perspective view of a winding wheel 12 of the present disclosure equipped with a plurality of devices for producing bundles of hollow fiber membranes. Twenty-three individual devices are mounted on the winding wheel 12 and all devices are shown in open configuration.

Figure 5:
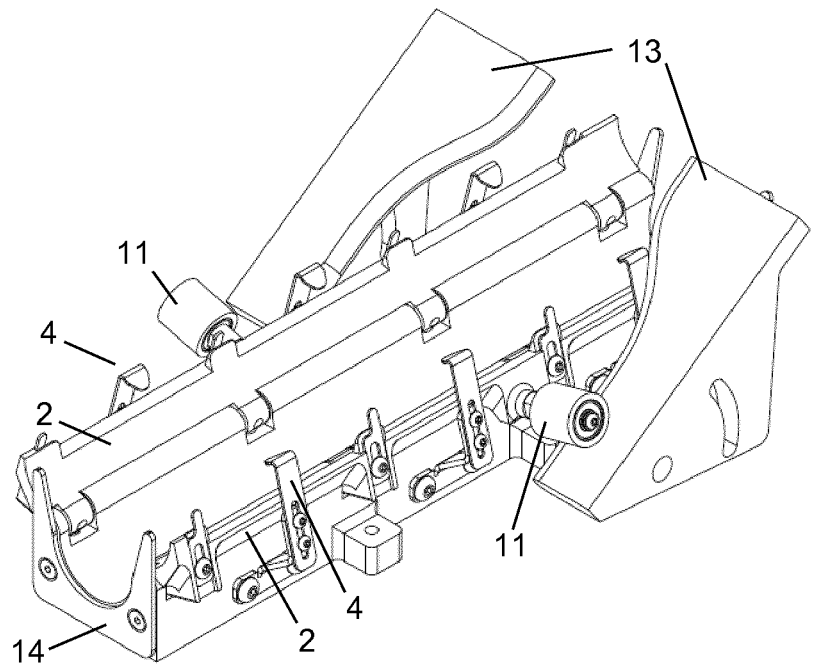
FIG. 5 shows views of a detail of an embodiment of a winding wheel equipped with a plurality of the devices of the present disclosure: a) perspective view, b) front view with device in opened configuration; c) front view with device in closed configuration.
Figure 5:
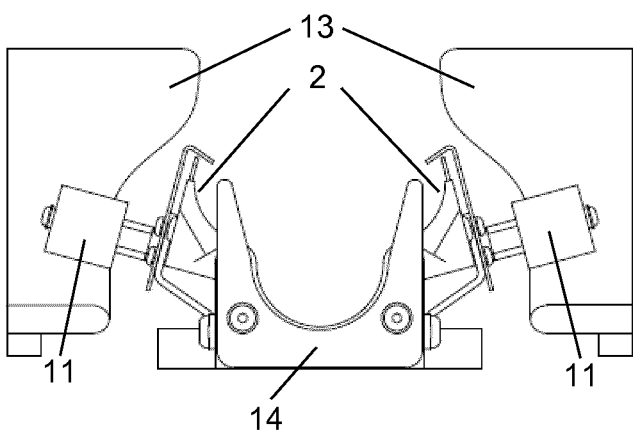
Figure 5:
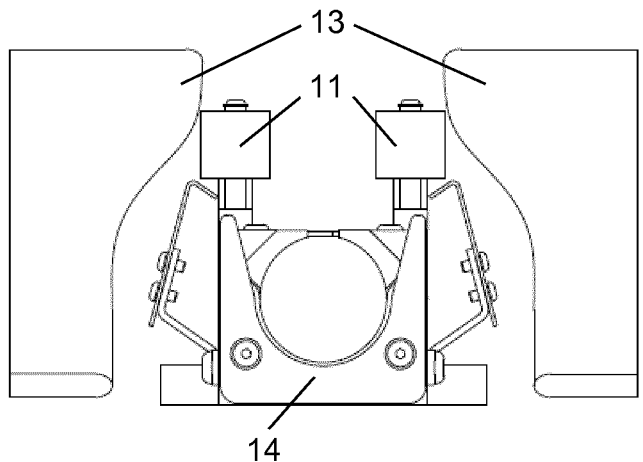

FIG. 5 shows views of a detail of an embodiment of a winding wheel 12 of the present disclosure equipped with a plurality of the devices. Drawing a) shows a perspective view of one of the devices mounted on a winding wheel. Faceplates 14 are located on both ends of the device. The faceplates guide the strand of hollow fiber membranes to be introduced in the device and facilitate cutting of the fibers at the face sides of the device after formation of the wrapped bundle. A closing device 13 is located adjacent to the winding wheel. The closing device 13 moves the flaps 2 of the device from the first position into the second position as the winding wheel rotates. In other words, the closing device 13 mechanically closes the device on ration of the winding wheel. This is illustrated by drawings b) and c). Drawing b) shows a front view with the device in opened configuration. As the winding wheel moves in the direction towards the closing device 13, the rollers 11 located on the flaps 2 of the device contact the edges of the lobes of the closing device 13. As the winding wheel progresses, the rollers 11 move upward along the edges of the closing device 13 and the flaps 2 are moved to the second position. Drawing c) shows a front view with the device in closed configuration. As the winding wheel progresses further, the rollers 11 detach from the lobes of the closing device 13.

LIST OF REFERENCE SIGNS 1 base
2 rigid flap
3 hinge
4 holding element
5 finger-like protrusion
6 handle
7 bundle of hollow fiber membranes
8 sheet of wrapping material
9 transport device
10 vacuum cup
11 roller
12 winding wheel
13 closing device
14 faceplate
15 nozzle

The invention claimed is:

1. A winding wheel equipped with a plurality of devices for wrapping a bundle of hollow fiber membranes, wherein each of the plurality of devices comprises:
   a base featuring a trough in the shape of a cylinder section; and
   on each longitudinal side of the trough, a rigid flap with an inner surface forming a cylinder section, each of the two flaps being connected to the base via a hinge, the hinges being located on the longitudinal brims of the trough, so that each of the two flaps is moveable between a first position and a second position,
   wherein each of the plurality of devices comprises a sheet of wrapping material and is configured to receive the sheet of wrapping material and a plurality of fibers when both flaps are in the first position, and the trough and the two flaps together frame a cylindrical void when both flaps are in the second position.

2. The winding wheel of claim 1, wherein one of the two flaps of each of the plurality of devices is larger than the other of the two flaps.

3. The winding wheel of claim 1, wherein at least one of the flaps of each of the plurality of devices comprises fingerlike protrusions.

4. The winding wheel of claim 3, wherein the two flaps of each of the plurality of devices comprise finger-like protrusions which interlock when the two flaps are in the second position.

5. The winding wheel of claim 1, wherein the two flaps of each of the plurality of devices do not touch each other when the two flaps are in the second position.

6. The winding wheel of claim 1, wherein only a part of the circumference of the cylindrical void of each of the plurality of devices is covered by the trough and the two flaps together when the two flaps are in the second position.

7. The winding wheel of claim 1, wherein each of the plurality of devices comprises means for fastening a sheet of wrapping material in the device.

8. The winding wheel of claim 7, wherein the means for fastening a sheet of wrapping material in the device comprise a suction device.

9. The winding wheel of claim 7, wherein the means for fastening a sheet of wrapping material in the device comprise holding elements which lock opposite edges of the sheet of wrapping material.

10. The winding wheel of claim 1, wherein the wrapping material is a polymer film or paper.

11. The winding wheel of claim 1, additionally comprising means for moving the flaps of the devices back and forth between the first position and the second position.

12. A process for preparing a plurality of bundles of hollow fiber membranes, each bundle being enveloped in a sheet of wrapping material, said method comprising the steps of:
   a) moving both flaps of each of the devices of a winding wheel according to claim 1 into the first position;
   b) introducing a sheet of wrapping material into each of the devices;
   c) introducing a plurality of hollow fiber membranes into each of the devices by winding a strand of hollow fiber membranes onto the winding wheel into the troughs of the devices, so that the hollow fiber membranes are located atop the sheets of wrapping material;
   d) forming a cylindrical bundle of hollow fiber membranes and enveloping it with the wrapping material by successively moving the flaps of each of the devices into the second position; and
   e) sealing the longitudinal edge of the sheets of wrapping material.

13. The process of claim 12, wherein the process additionally comprises the step of f) cutting the hollow fiber membranes in between the devices subsequently to step e).

14. The process of claim 12, wherein the hollow fiber membranes are subsequently removed from the winding wheel.

15. The process of claim 14, wherein the hollow fiber membranes are transferred to an apparatus for placing the fiber bundles into tubular filter casings.

16. The process of claim 12, wherein step b) comprises use of a transport apparatus.

17. The process of claim 12, wherein step b) comprises transfer of a sheet of wrapping material from a stack into the devices.

18. The process of claim 16, wherein a transport apparatus removes a sheet of wrapping material from the stack and places the wrapping material into the devices.

19. The process of claim 16, wherein a sheet of wrapping material is cut from a spool of wrapping material, contacted by the transport apparatus, and placed into the devices.

20. The process of claim 16, wherein the transport apparatus comprises suction nozzles which aspirate the sheet of wrapping material, pliers to pick up the sheet of wrapping material, or pincers to pick up the sheet of wrapping material.

* * * * *